(12) United States Patent
Singleton

(10) Patent No.: US 6,558,609 B2
(45) Date of Patent: May 6, 2003

(54) BLOW MOLDING MACHINE AND A METHOD OF BLOW MOLDING A HOLLOW ARTICLE

(75) Inventor: Brian M. Singleton, Saline, MI (US)

(73) Assignee: Ann Arbor Machine Company, Chelsea, MI (US)

( * ) Notice: Subject to any disclaimer, the term of this patent is extended or adjusted under 35 U.S.C. 154(b) by 0 days.

(21) Appl. No.: 09/874,497

(22) Filed: Jun. 5, 2001

(65) Prior Publication Data

US 2002/0182284 A1 Dec. 5, 2002

(51) Int. Cl.[7] ............................ B29C 49/32; B29C 49/64
(52) U.S. Cl. .................. 264/537; 264/540; 264/542; 425/526; 425/531; 425/532; 425/534; 425/535
(58) Field of Search ........................ 425/534, 535, 425/532, 526, 531; 264/537, 540, 542

(56) References Cited

U.S. PATENT DOCUMENTS

| | | | | |
|---|---|---|---|---|
| 2,783,503 A | * | 3/1957 | Sherman | |
| 3,009,196 A | * | 11/1961 | Hagen | |
| 3,225,382 A | * | 12/1965 | Hagen | |
| 3,792,946 A | * | 2/1974 | Zavasnik | 425/533 |
| 3,982,872 A | * | 9/1976 | Kauffman et al. | 425/534 |
| 4,365,950 A | * | 12/1982 | Harry et al. | 425/534 |
| 4,560,340 A | * | 12/1985 | Younkin et al. | 264/532 |
| 5,573,791 A | * | 11/1996 | Marcus | 425/534 |
| 6,334,766 B1 | * | 1/2002 | McCormick | 425/534 |
| 6,358,038 B1 | * | 3/2002 | Rozenberg | 425/534 |

OTHER PUBLICATIONS

Edwin G. Fisher, Blow Moulding of Plastics, 1971, The Plastics Institute, p. 110.*

* cited by examiner

Primary Examiner—Robert Davis
(74) Attorney, Agent, or Firm—Olson & Hierl, Ltd.

(57) ABSTRACT

A blow molding machine capable of relatively high production rates at relatively low cost is provided. The blow molding machine comprises a base, a reciprocating shuttle mechanism supported by the base, a single blow molding station supported by the base, and adapted to receive a parison for forming the hollow article at the blow molding station, a pair of cooling stations supported by the base on flanking sides of the blow molding station, a pair of blow pin carriages spaced from one another, each of which is connected to the shuttle mechanism and is indexable to the blow molding station and to one of the cooling stations. Each blow pin carriage can comprise one or more blow pin assemblies that are movable independent of the shuttle mechanism between a rest position and a blow position.

23 Claims, 4 Drawing Sheets

BLOW MOLDING MACHINE AND A METHOD OF BLOW MOLDING A HOLLOW ARTICLE

FIELD OF INVENTION

This invention relates to machines and sub-assemblies thereof for manufacturing hollow articles from thermoplastic materials by blow molding.

BACKGROUND OF INVENTION

Blow molding is a fabrication method for hollow thermoplastic shapes.

Two general classes of plastic products are made in this manner—packaging products and technical parts. Packaging products include such items as bottles, jars, jugs, cans, and the like. Technical parts include automotive components such as bumpers, fuel tanks, functional fluid containers, ducting, and the like.

The blow molding process can be of two general types: extrusion blow molding and injection blow molding. In extrusion blow molding, a parison is lowered between mold halves from an extruder. The mold halves then close around the parison, and the mold is transferred to a blowing station where the parison is then expanded against a mold cavity by introduction of a blowing gas, usually air. In injection molding, a thermoplastic material is first injection molded into a preform parison which is then transferred to a blow mold and expanded in the same manner as in an extrusion blow molding process. In both cases, however, the parison is transported from a parison receiving station to a blow molding station to complete the fabrication of a hollow plastic article.

In continuous extrusion, a molten parison is produced from an extruder die without interruption, and a segment thereof is severed and positioned into a mold. In many blow molding machines, the molds are moved from station to station on rotating vertical wheels, on a rotating horizontal table, or with a reciprocating action of a shuttle mechanism.

Most of the current blow molding machines utilize the reciprocating mold concept according to which the molds are shuttled back and forth from the parison receiving station to the blow molding station. A major drawback of the reciprocating mold concept, however, is a limitation on production rate because of the multiple stations in the process, namely the parison insertion station, the blow molding station, and the cooling station. Another drawback of the reciprocating mold concept is that many heavy parts must be moved during the blow molding process. For example, an entire shuttle mechanism with multiple blow molding stations and parison receiving stations may need to be moved during the process. Another concern present in many existing blow molding machines is the number of moving parts in the machines.

A further problem with most blow molding concepts is that after the parison is positioned in a mold, the mold is then taken to a separate blowing station where the air or other fluid is injected into the parison to form the hollow article. The time required to move the mold from the station where the parison is positioned to the blow molding station creates stress on the parison before inflation because of cooling that occurs with the parison, which makes the inflation process more difficult.

In view of the relatively large commercial demand for various types of plastic articles, it would be desirable to have a blow molding machine of relatively high capacity that can produce high quality articles at a relatively low cost, and which avoid the problems discussed. The present invention satisfies this desire by reducing the amount of tooling, reducing the mass of moving parts, reducing the traveling distance of moving parts, reducing the stress on the parison before inflation, minimizing in-mold time for the hollow article to improve cavity utilization, and maximizing cooling effectiveness.

SUMMARY OF THE INVENTION

The present invention provides a blow molding machine capable of relatively high production rates at relatively low cost, which requires fewer moving parts and reduces stress on the parison.

The foregoing advantages are achieved by a blow molding machine having a single blow molding station that also is adapted to receive a parison. In particular, the blow molding machine comprises a base, a reciprocating shuttle mechanism supported by the base, a single blow molding station supported by the base, which is adapted to receive a parison for forming the hollow article at the blow molding station, a pair of cooling stations supported by the base on flanking sides of the blow molding station, a pair of reciprocating blow pin carriages spaced from one another, each of which is connected to the shuttle mechanism and is indexable between the blow molding station and one of the cooling stations. Each blow pin carriage comprises one or more blow pin assemblies whose vertical positions relative to the shuttle mechanism are independently adjustable between a rest position and a blow position. The blow molding station is fixed relative to the base, and the blow pin carriages are indexed to the blow molding station alternatively. The shuttle mechanism, which moves in a substantially horizontal plane relative to the base, may be driven and controlled in any convenient manner, e.g., by a hydraulic driving mechanism, a mechanical driving device, or any other driving device as is known in the art, such as a pneumatic cylinder, a solenoid device, or the like.

The present invention may be adapted to mold a single hollow article or multiple hollow articles at a time. For example, if a single hollow article is to be formed, a single parison is received by a mold configured with a single cavity to form a single hollow article, such as a bottle. If multiple articles are to be formed, a single parison combined with a multiple cavity mold, or multiple parisons with a multiple cavity mold may be used.

As discussed above, parison used in blow molding can either be extruded, or preformed. The present blow molding machine may be arranged to accept either extruded parison or preforms into the blow molding station.

Once the parison is received at the blow molding station, the mold, which typically comprises two complementary mold halves, is closed around the parison, and in the case of an extruded parison, pinches shut one end of the parison. A blow pin carriage that comprises at least one blow pin assembly is juxtaposed relative to the mold, and the blow pin is moved to a blow position and is engaged with the mold. When the blow pin carriage is juxtaposed relative to the mold, the blow pin assembly can be engaged with the open end of the parison. Air or some other gaseous fluid is injected into parison, which causes the parison to be inflated inside the mold so as to form the molded article. The mold is then opened, and the molded hollow article is carried by the blow pin carriage to one of a pair of cooling stations that flank the molding station.

The present invention, when adapted to receive extruded parison, also preferably includes a top plate that is supported by the shuttle mechanism and is adapted to move in a substantially horizontal plane relative to the base. This top plate defines one or more apertures through which the parison may be received to be formed into a hollow article. As the formed hollow article is carried from the blow molding station to the cooling station, flash produced during the molding operation is supported by the top plate, and particularly by an edge of one of the apertures in the top plate.

The cooling station is comprised of a holding mechanism, which may be any device or arrangement that can be used to receive and grasp a molded hollow article as is known in the art. Preferably, this holding mechanism includes one or more pairs of gripping rails juxtaposed relative to one another and spaced to receive and grasp a molded hollow article in between the gripping rails. After the molded hollow article is received and grasped by the holding mechanism, such as the gripping rails, the blow pin assembly is retracted downwardly from the blow position to a rest position such that the blow pin assembly is sufficiently lowered out of the hollow article so that it may be moved in a substantially horizontal plane back to the, blow molding station, and away from the cooling station for the next operating cycle. Alternatively, if the molded hollow article is sufficiently cooled during its transport from the blow molding station to the cooling station, the hollow article may be ejected upon reaching the cooling station.

After a hollow article is molded, and as it is being carried to one of the cooling stations by a first of the blow pin carriages, the second blow pin carriage is indexed with the blow molding station, is raised to a blow position, and engaged with the mold. A parison is then inflated and molded in the same manner as previously discussed. Once this second hollow article is molded, and the mold is opened, the molded hollow article is carried by the blow pin carriage to the cooling station on the opposite flank from the previous cooling station. The first blow pin carriage is shuttled back to the blow molding station as the second hollow article is transported to the opposite cooling station. This alternating process cycle is continued as long as desired.

In one embodiment of the present invention, a formed hollow article is held at the cooling station until the next formed hollow article is carried by the blow pin carriage to the cooling station and knocks the first hollow article out of the cooling station holding mechanism. For example, where the holding mechanism is the pair of gripping rails juxtaposed relative to one another and spaced to receive and grasp a molded hollow article in between the rails, the next formed hollow article is carried to and in between the rails. As the second molded hollow article is carried between the two rails, it pushes the previous hollow article out of the cooling station into a bin or the like.

DESCRIPTION OF PREFERRED EMBODIMENTS

Figure 1:
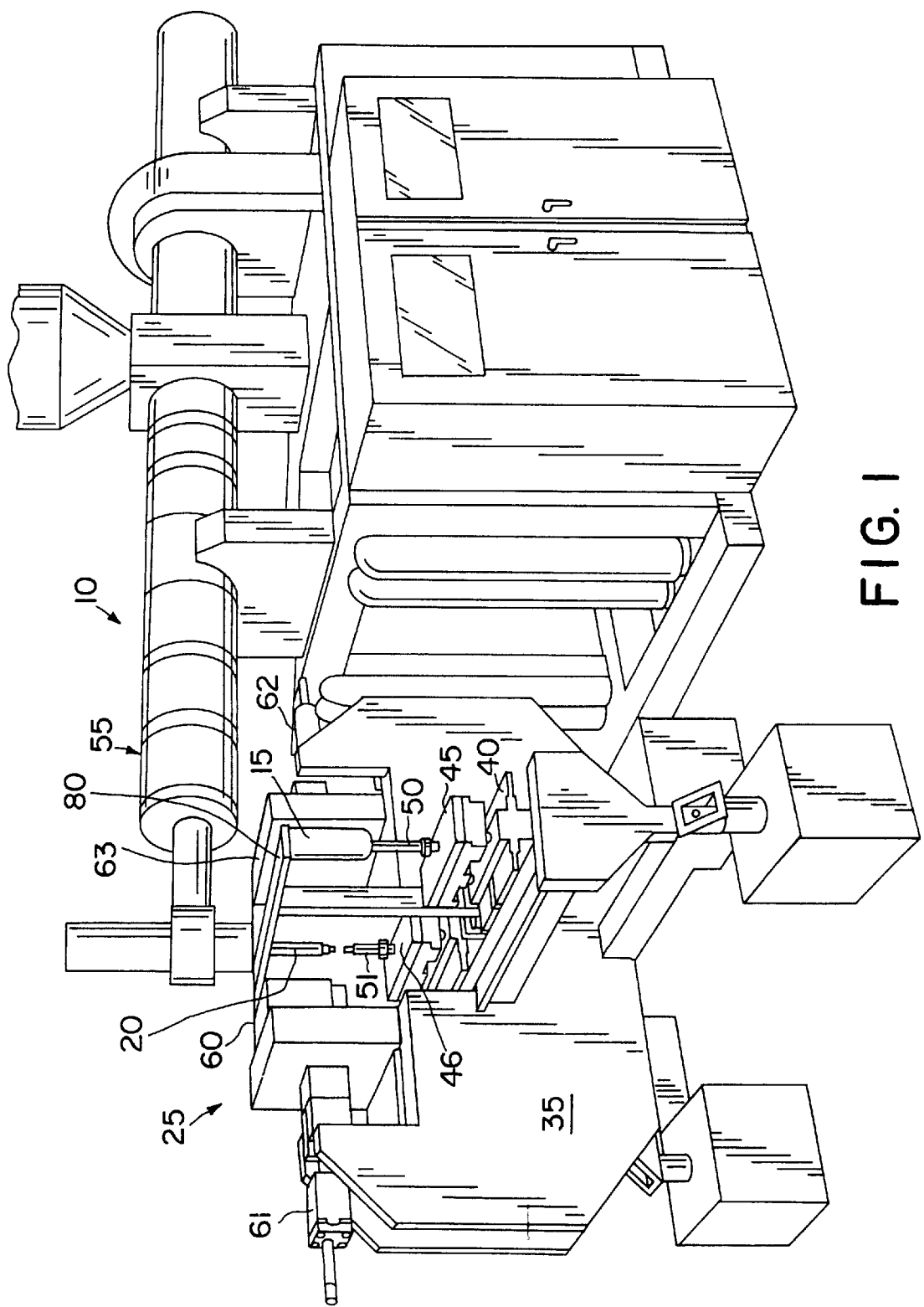
FIG. 1 is a perspective view of a blow molding machine that shows an embodiment of the present invention.

The invention disclosed herein is susceptible to embodiment in many different forms. Shown in the drawings and described in detail hereinbelow are certain preferred embodiments of the present invention. The present disclosure, however, is an exemplification of the principles and features of the invention, but does not limit the invention to the illustrated embodiments.

For ease of description, the blow molding machine of this invention will be described as it exists in a normal operating position, and terms such as upper, lower, top, bottom, vertical, horizontal, etc. will be used with reference to that position. Also for ease of description, the invention will be described in the context of the formation of single bottles with a single mold.

Referring to FIG. 1, an embodiment of a blow molding machine 10 suitable for molding a hollow article 15, such as a plastic bottle, from a thermoplastic parison 20 according to the present invention is shown. Also shown in FIG. 1 is a base 35, a reciprocating shuttle mechanism 40 supported by the base 35, a single blow molding station 25 with a pair of spaced cooling stations 30, 31 (FIG. 2) flanking the blow molding station 25, a pair of blow pin carriages 45, 46 spaced from one another, each of which is connected to the shuttle mechanism 40 and is indexable between the blow molding station 25 and one of the cooling stations 30 by linear reciprocatable movement. Each blow pin carriage 45, 46 comprises one or more blow pin assemblies 50, 51 that extend upwardly from their respective carriages and are movable not only horizontally by the shuttle mechanism 40, but also independently of the shuttle mechanism 40 between a rest position and a blow position as described in detail below. The positions of the blow molding station 25 and the cooling stations 30, 31 (FIG. 2) are adjustably fixed relative to the base 35. In other words, during normal operation of the blow molding machine 10, the blow molding station 25 and cooling stations 30, 31 are stationary relative to the base 35. The blow molding station 25 and cooling stations 30, 31 may be configured to be individually adjusted between molding operations depending on the subsequent molding operation intended.

The parison 20 to be molded may be supplied by a continuous extruder 55 (FIG. 1). Instead of continuous extrusion, the parison to be molded can also be supplied to the blow molding station 25 as a preform. (not shown). Both continuous extrusion devices and parison preform insertion devices are well known in the art. Therefore, it is contemplated that any suitable extrusion device or preform insertion device may be utilized with the present invention. It is preferred that the parison 20 is extruded such that it will be engaged from below by one of the blow pin assemblies 50, 51. In this preferred arrangement, the top of the extruded parison 20 is pinched and sealed shut by the closing of complementary mold halves 60, 63, which together form the mold (FIG. 2).

Figure 2:
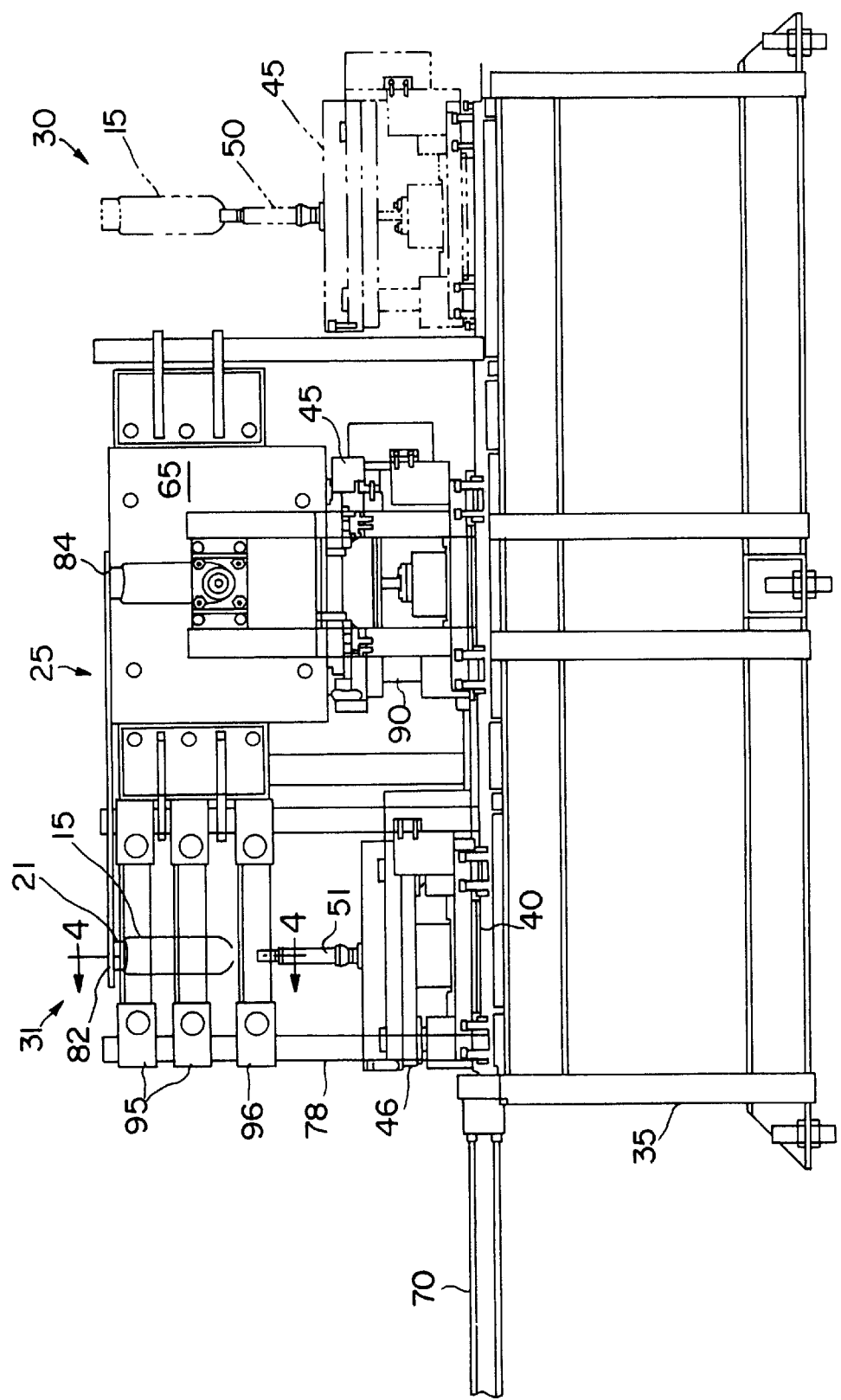
FIG. 2 is a partial side elevation schematic view of a blow molding machine that may be embodied in the present invention.

Referring to FIG. 2, the reciprocating shuttle mechanism 40 is movable in a substantially horizontal plane relative to the base 35. FIG. 2 shows the blow molding machine 10 with the cooling stations 30 and 31, and the blow molding station 25. The location of the cooling station 30 and blow pin carriage 45 together with blow pin assembly 50 are shown in phantom, but the components that preferably make up the cooling station 30, such as gripping rails, are not shown, but are substantially the same as those shown with cooling station 31. The shuttle mechanism 40 moves in a reciprocating manner. In the preferred embodiment, the shuttle mechanism 40 is moved by hydraulic cylinder 70 which is also supported by the base 35. Alternatively, any other device for actuating the shuttle mechanism 40 may be used, such as a solenoid device, a mechanical driving device, a pneumatic cylinder or the like. In the preferred embodiment of the present invention, the shuttle mechanism 40, which is a relatively heavy part of blow molding machine 10, is movable only in a substantially horizontal plane, and is not movable vertically relative to the base 35.

The shuttle mechanism 40 indexes blow pin assemblies 50, 51 with the blow molding station 25 and the cooling stations 30, 31. In FIG. 2, blow pin assembly 50 is shown engaged with the mold 65 at the blow molding station 25. Blow pin assembly 50 is also shown with blow pin carriage 45 in phantom at cooling station 30, to indicate where blow pin assembly 50 may be indexed when at cooling station 30.

Specifically shown in FIGS. 1 and 2, mounted on the shuttle mechanism 40 are a pair of blow pin carriages 45, 46. In this preferred embodiment, a top plate assembly 80 is also mounted on the shuttle mechanism 40. As shown in FIG. 2, top plate 80 defines one or more apertures 82, 84 through which the parison 20 may be passed to be formed into a hollow article 15. After the hollow article 15 is formed, and as formed hollow article 15 is carried from the blow molding station 25 to one of the cooling stations 30, 31, a flash portion 21 generated during the molding process is supported by the top plate 80, and more particularly by an edge of the apertures in the top plate 82, 84. Gripping rails 95, 96 retain the molded hollow article 15 at cooling stations 30, 31 after the blow pin has been withdrawn from the molded hollow article 15.

Figure 3:
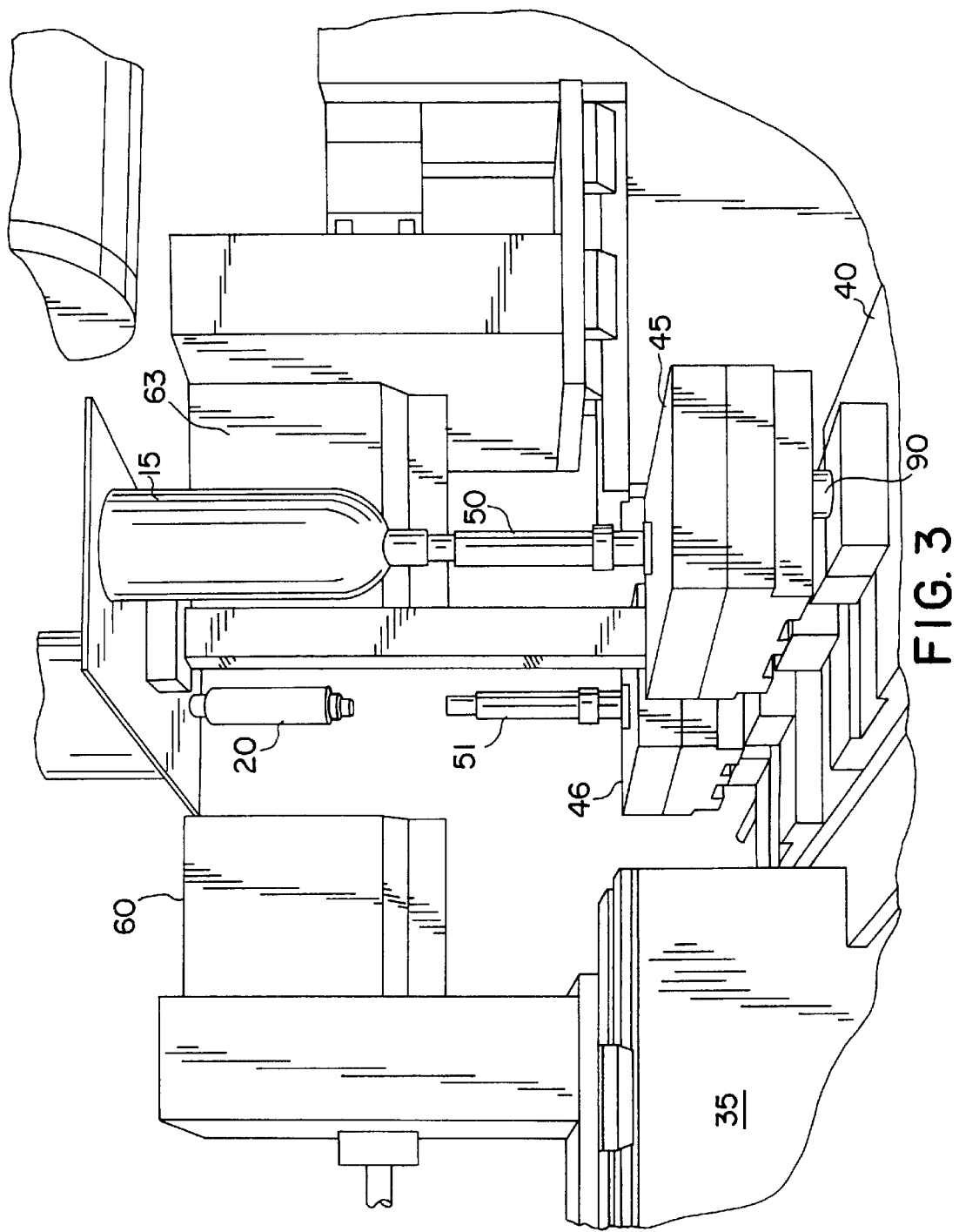
FIG. 3 is a partial side elevation view of a blow molding station showing a blow molding station.

Referring to FIG. 3, each of the blow pin carriages 45, 46 includes at least one blow pin assembly 50, 51. As discussed, each blow pin carriage 45, 46 may also have multiple blow pin assemblies if desired. In the embodiment shown, where only a single hollow article 15 is being formed per molding operation at the blow molding station 25 (FIG. 3), each blow pin carriage 45, 46 has only one blow pin assembly 50, 51. Shown in FIG. 3 is blow pin assembly 50, which is of a type conventionally used in an extrusion blow molding apparatus, but may be of any arrangement that is capable of inflating a parison in a mold, either concurrently extruded or preform. Each of the blow pin carriages 45, 46 is adapted to engage the mold constituted by mold halves 60 and 63 at the blow molding station 25 (FIG. 3), and to enable its respective blow pin assembly 50, 51 to engage and inflate the parison 20 so as to form the hollow article 15, such as a bottle. The parison 20 is engaged from below the mold halves 60, 63. Each of the blow pin carriages 45, 46 is also adapted to carry a molded hollow article 15 after it has been formed from the parison 20 so that the hollow article 15 may be transported from the blow molding station 25 to one of the cooling stations 30, 31 (FIG. 2) by a blow pin carriage 45, 46 without the use of an additional carrying device. For example the formed molded hollow article 15 may simply rest on the blow pin carriage 45, 46. In a preferred embodiment, the blow pin assemblies 50, 51 themselves, each of which is part of a blow pin carriage 45, 46, may be adapted to carry a molded hollow article 15 as shown in FIG. 3 with respect to blow pin assembly 50. It is further preferred that the top plate 80 supports flash portion 21 during the transport of the formed hollow article 15 to one of the cooling station 30, 31.

As also shown in FIG. 3, the mold halves 60 and 63 are moved from an open mold position to a closed mold position by hydraulic cylinders 61 and 62 (FIG. 1), or by any other suitable clamping mechanism. In the closed mold position the parison is enveloped by the mold halves 60 and 63. As the mold is closed, one of the blow pin carriages 45 or 46 is engaged with the mold, and a blow pin assembly 50 or 51 is engaged with the parison so as to inflate the parison 20 to form the hollow article 15. As discussed, with an extruded parison, the mold halves 60, 63, pinch together when closed to seal the top end of the parison 20 to be molded. In a preferred embodiment, the blow pin assembly 50, 51 is upwardly extending and positioned so that the blow pin assembly 50, 51 engages the parison 20 from below at the open bottom end of the parison 20 when the respective blow pin carriages are elevated. As shown in FIG. 2, blow pin carriage 45 is shown in blow position (blow pin assembly 50 is obstructed by mold 65), such that blow pin carriage 45 and blow pin assembly 50 are elevated relative to the blow molding station 25 and engage the parison within mold 65 to form the hollow article 15.

After the hollow article 15 is formed, the mold halves 60 and 63 (FIG. 3) are opened to allow the formed hollow article 15 to be transported away from the blow molding station 25 to one of the pair of cooling stations 30, 31 flanking the blow molding station 25. As discussed above, a preferred embodiment of an extrusion blow molding machine includes a top plate assembly 80 that is reciprocated above the mold 65, and which supports the hollow article 15 by the flash portion 21.

As shown in FIG. 2, blow pin carriage 45 is indexable with the blow molding station 25 and cooling station 30, and blow pin carriage 46 is indexable with blow molding station 25 and cooling station 31. The blow pin carriages 45 and 46 are indexable with the blow molding station 25 and one of the cooling stations 30 or 31 via conveyance by the shuttle mechanism 40 horizontally along the base 35. In a highly preferred embodiment, while one of the blow pin carriages, for example blow pin carriage 45, is indexed with the blow molding station 25, the other blow pin carriage 46 is indexed with cooling station 31.

Also shown in FIG. 2, each of the blow pin carriages 45, 46 is individually reciprocatable in a substantially vertical plane between a rest position and a blow.position. The blow position is the relatively higher position of each of the blow pin carriages 45 and 46, i.e., the blow pin carriage is raised sufficiently to engage the mold 65 enveloping the parison 20 at the blow molding station 25. As discussed below, a molded article 15 is moved in a horizontal direction to one of the cooling stations 30, 31. The blow pin carriages preferably remain in the blow position as it is shuttled to the cooling station as depicted with blow pin carriage 45 shown at the blow molding station 25, and shown in phantom at cooling station 30. The rest position is discussed in greater detail below, but refers to the relatively lower position of blow pin carriages 45, 46. The blow pin carriages 45, 46 may be individually raised or lowered between the blow position and rest position by a hydraulic mechanism 90. The mechanism for reciprocating the blow pin carriages 45, 46 may be any device suitable for raising and lowering the blow pin carriages 45, 46, such as a solenoid device, a mechanical arrangement, a pneumatic cylinder, a cam and cam follower arrangement, or the like.

In a preferred embodiment, each cooling station 30, 31 includes a mechanism for holding a formed hollow article. This holding mechanism can be any arrangement suitable for holding a hollow article. In a particularly preferred embodiment shown in FIG. 4, the holding mechanism is constituted by spaced pairs of gripping rails 95, 96 juxtaposed relative to one another and spaced so that the formed hollow article 15 is received between the gripping rails 95, 96 such that the hollow article 15 is held by the slight pinching of the gripping rails 95, 96. The gripping rails 95, 96 are preferably supported by the base via one of cooling station supports 77 or 78 (FIG. 2), or any other convenient manner. Alternatively, if the molded hollow article 15 has been sufficiently cooled during its transport to the cooling station 30 or 31, the hollow article 15 may be ejected upon reaching the cooling station 30 or 31, or soon thereafter. The flash 21, is preferably removed in a separate process.

Figure 4:
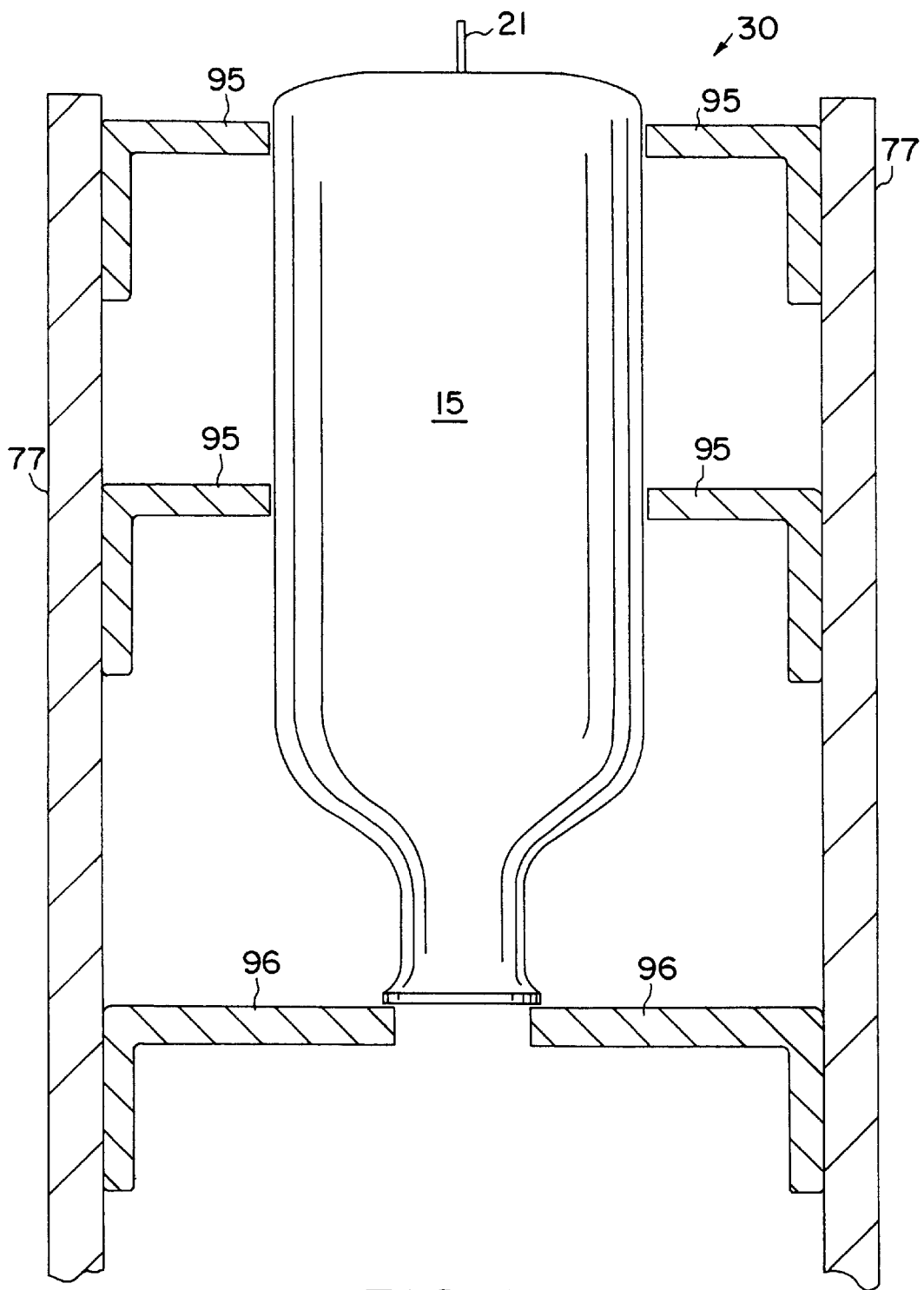
FIG. 4 is a partial side elevation of an embodiment of one of the pair of cooling stations that may be embodied in the present invention.

As shown in FIGS. 2 and 4, as the hollow article 15 is held by the holding mechanism, such as gripping rails 95, 96, the blow pin carriage 46 and blow pin assembly 51 is reciprocated from the blow position to a rest position. The rest position is a position where the blow pin carriage 46 and blow pin assembly 51 are in a relatively lower position relative to the formed hollow article 15 such that the blow pin carriage 46 and blow pin assembly 51 can clear the hollow article 15 and be shuttled horizontally away from the cooling station 31 and to the blow molding station 25. In one embodiment, each of the blow pin assemblies 50, 51 may be fixed relative to its respective blow pin carriage 45 or 46 such that the reciprocal motion of each blow pin carriage 45, 46 is the means for engaging its respective blow pin assembly 50 or 51 with the parison 20. In an alternative embodiment, each of the blow pin assemblies 50, 51 may be raised or lowered independently of its respective blow pin carriage 45 or 46 to the rest position and blow position. Alternatively still, any combination of movements of the blow pin carriages 45, 46 and the blow pin assemblies 50, 51 may be used.

In another embodiment of the present invention, a formed hollow article 15 is held at a cooling station 30, 31 until the next formed hollow article is carried by the blow pin carriage 50, 51 to the cooling station 30, 31 and knocks or pushes the first hollow article out from between the gripping rails 95, 96. Specifically, where a first formed hollow article is held between the pair of gripping rails 95, 96, a second formed hollow article is carried in between the gripping rails 95, 96 and pushes the first hollow article out of the cooling station 30. Alternatively, the formed hollow article may be ejected from the cooling station 30 by any means known in the art. After the formed hollow article 15 has been ejected from the cooling station, any remaining flash may be trimmed from the hollow article, by any convenient method known in the art (not shown).

The foregoing description and the drawings are illustrative of the present invention and are not to be taken as limiting. Still other variants and rearrangements of parts within the spirit and scope of the present invention are possible and will be readily apparent to those skilled in the art.

I claim:

1. A blow molding machine suitable for molding a hollow article from an extended thermoplastic parison, the blow molding machine comprising:
   a base;
   a reciprocating shuttle mechanism supported by the base;
   a top plate supported by the shuttle mechanism and defining at least a pair of through apertures adapted to receive therethrough a segment of the extruded parison;
   a single blow molding station supported by the base, adapted to receive a parison for forming the hollow article at the blow molding station;
   a pair of cooling stations supported by the base and flanking the blow molding station;
   a pair of blow pin carriages spaced from one another, each connected to the shuttle mechanism for linear reciprocal movement, and indexable in a substantially horizontal plane to the blow molding station and to one of the cooling stations; and
   each blow pin carriage comprising at least one blow pin assembly reciprocatable between a rest position and a blow position independently of the shuttle mechanism.

2. A blow molding machine according to claim 1, wherein the shuttle mechanism further comprises a hydraulic drive mechanism.

3. A blow molding machine according to claim 1, wherein the parison is an extruded parison.

4. The blow molding machine according to claim 1, wherein each of the pair of through apertures in the top plate is adapted to receive therethrough a segment of the extruded parison and to support a flash portion produced during molding of the parison.

5. A blow molding machine according to claim 1, wherein the single blow molding station further comprises a mold including opposed complementary mold halves which are hydraulically movable to open and closed positions.

6. A blow molding machine according to claim 1, wherein each cooling station further comprises a holding mechanism.

7. A blow molding machine according to claim 6, wherein each cooling station further comprises a holding mechanism including a pair of rails juxtaposed relative to one another and spaced to receive therebetween and grasp a molded hollow article.

8. A blow molding machine according to claim 1, wherein the at least one blow pin assembly further is upwardly directed.

9. A blow molding machine according to claim 1, wherein the blow pin carriage is reciprocated between the rest position and blow position by a hydraulic mechanism.

10. A blow molding machine according to claim 1, wherein the blow pin carriage is adapted to carry the hollow article from the molding station to one of the cooling stations.

11. A blow molding machine according to claim 1, wherein the parison is a preform.

12. A blow molding machine according to claim 1, wherein a plurality of hollow articles can be molded at the blow molding station.

13. A blow molding machine suitable for molding a hollow article from a thermoplastic parison, the blow molding machine comprising:
    a base;
    a reciprocating, hydraulically controlled shuttle mechanism supported by the base;
    a top plate supported by the shuttle mechanism and defining at least a pair of through apertures adapted to receive therethrough and sever a segment of the parison;
    a single blow molding station and supported by the base, adapted to receive a parison for forming the hollow article at the blow molding station;
    a pair of cooling stations supported by the base and flanking the blow molding station;
    a pair of blow pin carriages spaced from one another, each blow pin carriage connected to the shuttle mechanism for linear reciprocal movement, and indexable in a substantially horizontal plane to the blow molding station and to one of the cooling stations; and
    each blow pin carriage comprising at least one upwardly extending blow pin assembly hydraulically reciprocatable between a rest position and a blow position independently of the shuttle mechanism.

14. A blow molding machine according to claim 13, wherein the parison is an extruded parison.

15. A blow molding machine according to claim 13, wherein the single blow molding station further comprises a mold including opposed complementary mold halves which are hydraulically movable to open and closed positions.

16. A blow molding machine according to claim 13, wherein each cooling station further comprises a holding mechanism.

17. A blow molding machine according to claim 16, wherein each cooling station further comprises a holding mechanism including a pair of rails juxtaposed relative to one another and spaced to receive therebetween and grasp a molded hollow article.

18. A blow molding machine according to claim 13, wherein the blow pin carriage is adapted to carry the hollow article from the molding station to one of the cooling stations.

19. A blow molding machine according to claim 13, wherein the parison is a preform.

20. A blow molding machine according to claim 13, wherein a plurality of hollow articles can be molded at the blow molding station.

21. A blow molding machine suitable for molding a hollow article from an extruded thermoplastic parison, the blow molding machine comprising:

a base;

a reciprocating, hydraulically controlled shuttle mechanism supported by the base;

a top plate supported by the shuttle mechanism defining a pair of through apertures, each aperture adapted to receive therethrough and sever a segment of the extruded parison;

a single blow molding station comprising a mold including opposed complementary mold halves which are hydraulically movable to open and closed positions, the blow molding station being supported by the base and adapted to receive the extruded parison for molding the hollow article at the blow molding station;

a pair of cooling stations supported by the base and flanking the blow molding station, each cooling station further comprising a holding mechanism including a pair of rails juxtaposed relative to one another and spaced to receive therebetween and grasp a molded hollow article;

a pair of blow pin carriages each connected to the shuttle mechanism for linear reciprocal movement, spaced from one another, and indexable in a substantially horizontal plane to the blow molding station and to one of the cooling stations, the blow pin carriage being adapted to carry the hollow article from the molding station to one of the cooling stations; and each blow pin carriage comprising at least one upwardly extending blow pin assembly hydraulically reciprocatable between a rest position and a blow position independently of the shuttle mechanism.

22. A blow molding machine according to claim 21, wherein a plurality of hollow articles can be molded at the blow molding station.

23. A method for blow molding a hollow article from a tubular thermoplastic parison comprising the steps of:

supplying the thermoplastic parison through an aperture in a top plate supported by a reciprocating blow pin shuttle mechanism to a single blow molding station supported on a base, the blow molding station comprising a mold including a plurality of complementary sections;

closing the plurality of complementary sections of the mold such that the mold surrounds the parison and seals one end of the parison;

engaging a blow pin carriage supported on the shuttle mechanism with the single blow molding station, the blow pin carriage comprising at least one blow pin assembly that engages an open end of the parison;

inflating the parison within the closed mold by injecting a gaseous fluid into the parison through the at least one blow pin assembly to create a formed hollow article within the mold;

opening the complementary sections of the mold sufficiently to release the formed hollow article;

the blow pin carriage carrying the formed hollow article in a substantially horizontal plane away from the blow molding station and to a cooling station;

grasping the formed hollow article at the cooling station; and disengaging the blow pin carriage and blow pin assembly from the formed hollow article at the cooling station by lowering the blow pin carriage and blow pin assembly.

* * * * *